Patented Jan. 14, 1930

1,743,634

UNITED STATES PATENT OFFICE

SAMUEL LEWIS SUMMERS, OF FORT WASHINGTON, PENNSYLVANIA

METHYLENE-DISALICYLIC ACID DERIVATIVE

No Drawing.   Application filed October 12, 1928.   Serial No. 312,202.

My invention relates to organic compounds and their manufacture and is especially concerned with the iodination product of the diacetyl derivative of methylene-disalicylamide and its homologues such as hereinafter indicated. These substances (especially the particular one named) are useful for pharmaceutical purposes, as hereinafter indicated.
My product may be prepared as follows, though I do not limit myself to this particular method.

Starting with methylene-disalicylic acid, the first step is esterification. Various homologous esters may be produced. As the ester is converted into the amide in the next main step, the nature of the alcohol used in preparing the ester is of little consequence, since it does not influence the final product. Dissolve 288 lbs. of methylene-disalicylic acid in 150 lbs. of ethyl alcohol and slowly add to this a mixture of 60 lbs. of 66° Bé. sulphuric acid and 40 lbs. of water, keeping the temperature at or below 70° C. When this has all been added the mixture is heated under a reflux condenser to 150° C., and kept at that temperature for 2 hours. This yields as the essential product the diethyl ester of methylene-disalicylic acid:

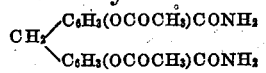

This may be freed from sulphuric acid and unreacted organic acid by washing with water followed by dilute soda solution.

The second main step is to convert this ester into the amide, which may be done as follows:

Heat 344 parts of the ethyl ester (or the corresponding amount of any other ester) of methylene-disalicylic acid with 120 parts of concentrated aqueous ammonia (28%) in an autoclave to 110° for 4 hours. The essential product is methylene-disalicylamide, having the formula:

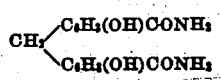

This is crystalline, nearly white in color, soluble in alcohol but insoluble in water.

The third main step is to acetylate this amide, which may be accomplished as follows, though I do not limit myself to this method:

286 parts of methylene-disalicylamide are dissolved in 100 parts of glacial acetic acid and 210 parts of acetic anhydride and heated under a reflux condenser for 2 hours. The essential product is the diacetyl derivative of methylene-disalicylamide:

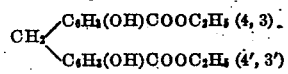

This is a crystalline substance, insoluble in water, but soluble in alcohol and ether.

The fourth main step is to iodinate this diacetyl derivative. One satisfactory way of accomplishing this is to dissolve 358 parts of this diacetyl derivative of methylene-disalicylamide in alcohol and run into this a solution of 254 parts of iodine in alcohol. To this mixture is added with vigorous stirring an excess of an oxide of a heavy metal, e. g., mercuric oxide, zinc oxide, or lead oxide. After the reaction is over, sufficient ammonium sulphide is added to precipitate the heavy metal that has gone into solution. The mixture is filtered and the organic compound allowed to crystallize out. The essential product is an iodine substitution product of diacetyl methylene-disalicylamide having the formula:

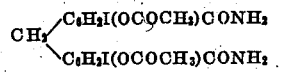

This is a crystalline compound, practically tasteless, insoluble in water but soluble in alcohol and ether. It is useful as an antiseptic, antineuralgic, antiarthritic and antirheumatic. The dose may be from 90 to 180 grains per day.

By varying the proportion of iodine and the time of the reaction, more than two or less than two atoms of iodine may be introduced. The products so obtained are of the same general nature as the diiodo derivative described and are useful for the same purposes.

Having thus described my invention, I claim:

1. The herein described iodination products of diacetyl-methylene-disalicylamide containing iodine in meta position to the methylene linkage; insoluble in water but soluble in alcohol.

2. The herein described iodination product of diacetyl-methylene-disalicylamide, insoluble in water but soluble in alcohol, and having the formula:

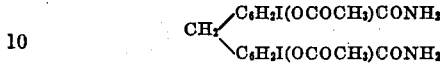

In testimony whereof, I have hereunto signed my name at Ambler, Pennsylvania, this 9th day of October, 1928.

SAMUEL LEWIS SUMMERS.